United States Patent [19]

Allais

[11] Patent Number: 4,794,239
[45] Date of Patent: Dec. 27, 1988

[54] MULTITRACK BAR CODE AND ASSOCIATED DECODING METHOD

[75] Inventor: David C. Allais, Edmonds, Wash.

[73] Assignee: Intermec Corporation, Lynnwood, Wash.

[21] Appl. No.: 108,844

[22] Filed: Oct. 13, 1987

[51] Int. Cl.$^4$ .............................................. G06K 7/10
[52] U.S. Cl. ..................................................... 235/462
[58] Field of Search ......................................... 235/462

[56] References Cited

U.S. PATENT DOCUMENTS 4,728,784 3/1988 Stewart ............................... 235/462

Primary Examiner—Harold I. Pitts
Attorney, Agent, or Firm—Seed and Berry

[57] ABSTRACT

A multitrack bar code and associated decoding method. Data are encoded into a multitrack bar code according to numerical values which correspond to the characters composing the data. The numerical values are combined into words and corresponding binary strings are chosen, the parity of each binary string being chosen according to the order of the row being encoded. Each row also includes a row check character, and the first row contains a character which checks the number of rows encoded and a data check sum on the data character values. If desired, column check sums can also be computed on each of the data-bearing rows in the multitrack bar code. The multitrack bar code can be encoded according to a numeric shift code when strings of numeric data of at least eight decimal digits are encountered. An alphanumeric shift character causes the multitrack bar code to return to the alphanumeric mode.

23 Claims, 9 Drawing Sheets

| $W_{11}$ | $W_{12}$ | $W_{13}$ | $W_{14}$ |
| --- | --- | --- | --- |
| $W_{21}$ | $W_{22}$ | $W_{23}$ | $W_{24}$ |
| $W_{31}$ | $W_{32}$ | $W_{33}$ | $W_{34}$ |
| $W_{41}$ | $W_{42}$ | $W_{43}$ | $W_{44}$ |
| $W_{81}$ | $W_{82}$ | $W_{83}$ | $W_{84}$ |

FIG.2B

| $C_{11}$ | $C_{12}$ | $C_{13}$ | $C_{14}$ | $C_{15}$ | $C_{16}$ | $C_{17}$ | $C_{18}$ |
| --- | --- | --- | --- | --- | --- | --- | --- |
| $C_{21}$ | $C_{22}$ | $C_{23}$ | $C_{24}$ | $C_{25}$ | $C_{26}$ | $C_{27}$ | $C_{28}$ |
| $C_{81}$ | $C_{82}$ | $C_{83}$ | $C_{84}$ | $C_{85}$ | $C_{86}$ | $C_{87}$ | $C_{88}$ |

FIG.3

$ROW_i$ = |←2→| START | ←16→ $C_{i1}$ | ←16→ $C_{i2}$ | $C_{i3}$ | $C_{i4}$ | $C_{i5}$ | $C_{i6}$ | $C_{i7}$ | $C_{i8}$ |←4→| STOP

8 CHARACTERS

FIG. 4

| CHARARACTER | VALUE | CHARARACTER | VALUE |
|---|---|---|---|
| 0 | 0 | P | 25 |
| 1 | 1 | Q | 26 |
| 2 | 2 | R | 27 |
| 3 | 3 | S | 28 |
| 4 | 4 | T | 29 |
| 5 | 5 | U | 30 |
| 6 | 6 | V | 31 |
| 7 | 7 | W | 32 |
| 8 | 8 | X | 33 |
| 9 | 9 | Y | 34 |
| A | 10 | Z | 35 |
| B | 11 | - | 36 |
| C | 12 | . | 37 |
| D | 13 | sp | 38 |
| E | 14 | $ | 39 |
| F | 15 | / | 40 |
| G | 16 | + | 41 |
| H | 17 | % | 42 |
| I | 18 | Ⓢ | 43 |
| J | 19 | ⊘% | 44 |
| K | 20 | ⊘/ | 45 |
| L | 21 | ⊕ | 46 |
| M | 22 | ns | 47 |
| N | 23 | as | 48 |
| O | 24 | | |

| $C_{11}$ | + | A | 1 | 2 | 3 | B | $C_{18}$ |
|---|---|---|---|---|---|---|---|
| 4 | C | 5 | D | 6 | E | 7 | $C_{28}$ |
| 1 | 1 | as | as | as | as | as | $C_{38}$ |

FIG.6B

| 7 | 41 | 10 | 1 | 2 | 3 | 11 | 43 |
|---|---|---|---|---|---|---|---|
| 4 | 12 | 5 | 13 | 6 | 14 | 7 | 20 |
| 1 | 1 | 48 | 48 | 48 | 48 | 48 | 26 |

FIG.7A

| $C_{11}$ | + | A | 1 | 2 | 3 | B | $C_{18}$ |
|---|---|---|---|---|---|---|---|
| 4 | C | 5 | D | 6 | E | 7 | $C_{28}$ |
| 1 | 1 | as | as | as | as | as | $C_{38}$ |
| $C_{41}$ | $C_{42}$ | $C_{43}$ | $C_{44}$ | $C_{45}$ | $C_{46}$ | $C_{47}$ | $C_{48}$ |

FIG.7B

| 14 | 41 | 10 | 1 | 2 | 3 | 11 | 1 |
|---|---|---|---|---|---|---|---|
| 4 | 12 | 5 | 13 | 6 | 14 | 7 | 20 |
| 1 | 1 | 48 | 48 | 48 | 48 | 48 | 26 |
| 25 | 19 | 17 | 24 | 11 | 28 | 22 | 21 |

FIG. 7C

| $C_{11}$ | P | 1 | 4 | 0 | 1 | 5 | $C_{18}$ |
|---|---|---|---|---|---|---|---|
| 2 | 4 | 8 | $ | M | Q | 1 | $C_{28}$ |
| 0 | 0 | $ | M | V | 0 | 4 | $C_{38}$ |
| 0 | 8 | 9 | 8 | 7 | 5 | 5 | $C_{48}$ |
| $ | M | S | 0 | 0 | 0 | 2 | $C_{58}$ |
| 1 | 1 | 1 | as | as | as | as | $C_{68}$ |
| $C_{71}$ | $C_{72}$ | $C_{73}$ | $C_{74}$ | $C_{75}$ | $C_{76}$ | $C_{77}$ | $C_{78}$ |

FIG. 8A

| 35 | 25 | 1 | 4 | 0 | 1 | 5 | 3 |
|---|---|---|---|---|---|---|---|
| 2 | 4 | 8 | 43 | 22 | 26 | 1 | 39 |
| 0 | 0 | 43 | 22 | 31 | 0 | 4 | 12 |
| 0 | 8 | 9 | 8 | 7 | 5 | 5 | 33 |
| 43 | 22 | 28 | 0 | 0 | 0 | 2 | 40 |
| 1 | 1 | 1 | 48 | 48 | 48 | 48 | 32 |
| 15 | 34 | 34 | 35 | 12 | 18 | 43 | 4 |

FIG. 8B

| $C_{11}$ | P | ns | (1 | 4 | 0 | 1 | 5) | (2 | $C_{18}$ |
|---|---|---|---|---|---|---|---|---|---|
| 4 | 8) | as | $ | M | Q | 1 | | 0 | $C_{28}$ |
| 0 | $ | M | V | ns | (0 | 4 | 0 | | $C_{38}$ |
| 8 | 9) | (8 | 7 | 5) | as | 5 | $ | M | $C_{48}$ |
| S | 0 | 0 | 0 | 2 | 1 | | | 1 | $C_{58}$ |
| 1 | as | as | as | as | as | as | | | $C_{68}$ |
| $C_{71}$ | $C_{72}$ | $C_{73}$ | $C_{74}$ | $C_{75}$ | $C_{76}$ | $C_{77}$ | | | $C_{78}$ |

| 33 | 25 | 47 | 6  | 16 | 9  | 5  | 30 |
|----|----|----|----|----|----|----|----|
| 12 | 48 | 43 | 22 | 26 | 40 | 0  | 9  |
| 0  | 43 | 22 | 31 | 47 | 1  | 40 | 4  |
| 24 | 18 | 29 | 48 | 5  | 43 | 22 | 14 |
| 28 | 0  | 0  | 0  | 2  | 1  | 1  | 3  |
| 1  | 48 | 48 | 48 | 48 | 48 | 48 | 22 |
| 0  | 35 | 42 | 8  | 46 | 44 | 18 | 33 |

MULTITRACK BAR CODE AND ASSOCIATED DECODING METHOD

This invention relates to bar code structures and methods for decoding them, and more particularly, to a multitrack bar code for placement on small objects and a method for decoding the multitrack bar code.

BACKGROUND ART

Bar code has become broadly accepted as the primary means for automatically identifying and tracking objects ranging in size from large freight containers down to printed circuit boards and other moderately small components. A bar code is typically a linear array of elements that are either printed directly on the object to be identified and/or tracked, or printed on labels that are attached to the object. The bar code elements are bars and spaces. The bars represent strings of binary ones, and the spaces represent strings of binary zeros. They are generally read by optical techniques, such as scanning laser beams or handheld wands. One common example of a bar code is the Universal Product Code (UPC).

The contrasting parallel bars and spaces of a bar code have varying widths. Generally, the bars and spaces can be no smaller than a specified minimum width, termed the code's "unit" (or "x-dimension" or "module"). While the theoretical minimum unit size is the wavelength of the light being used to read the bar code, there are other practiaal limitations. Among them are the desired depth of field of the reading equipment, the limitations of a given printing process, and the robustness of the printed image to be correctly read despite dust, dirt, and minor physical damage.

A common example of a bar code structure is CODE 39, which enjoys broad acceptance in manufacturing, hospitals, libraries, universities, and government agencies. It is used for alphanumeric labeling applications. CODE 39 (also known as "3 of 9 Code") is so named because the original concept provided for 39 characters. The name also derives from its 3 out of 9 structure wherein 3 of 9 elements (i.e., bars or spaces) are wide and the remaining 6 are narrow.

The complete forty-four character set of CODE 39 includes a Start/Stop character and forty-three data characters. The data characters consist of the ten digits, the twenty-six letters of the alphabet, the space, and the six symbols, "—", ".", "$", "/", "+", and "%". It is possible to represent a character which is not in the basic set of forty-three data characters (such as an ASCII character) in CODE 39. Any of the 128 ASCII characters is represented by using the characters $, /, +, and % as precedence characters in front of one of the alphabetic characters. For example, "+B" represents a lower case letter b while "$B" represents a "control" B (the ASCII "STX" character).

Most of the characters in CODE 39 are represented by a stand-alone group of five bars with their four included spaces. Two of the five bars are wide, giving (5!/2!3!)=10 possible bar configurations, and one of the four spaces is wide, giving 4×10=40 possible characters. The four additional characters ($, /, +, and %) are structured with all the bars narrow and three spaces wide.

CODE 39 is self-checking. This strong property, along with its variable length and capability of handling alphanumeric data, means that it can be successfully printed by a very broad variety of equipment and processes.

One problem with CODE 39 is that each of its characters is relatively wide, occupying thirteen to sixteen units of width. This can be important where constraints due to printing equipment (such as matrix line printers) impose a minimum size on individual bar widths. Another bar code, CODE 93, is a very high density alphanumeric symbology designed explicitly as a companion to CODE 39 and intended to overcome this problem. The set of data characters in CODE 93 is identical to that of CODE 9. Self-discriminating bar code readers or scanners can read either CODE 39 or CODE 93 without operator intervention. This compatibility allows CODE 93 symbols to be introduced into existing systems with minimal impact.

CODE 93 is a (9,3) code of the (n,k) family defined by Savir and Laurer in "The Characteristics and Decodability of the Universal Product Code," IBM Systems Journal, Vol. 14, No. 1, 1975. (n,k) codes represent characters uniquely by a string of n bits containing k runs of 1 bits (i.e., k bars) and k runs of zero bits (i.e., k spaces). The first bit of a character has a binary value of one. An (n,k) code is decodable backwards. The name, CODE 93, derives from this (n,k) notation.

Each CODE 93 character consists of 9 units arranged into three bars and three spaces. Forty-eight of the fifty-six possible combinations are used in CODE 93. One of these characters is reserved for a start/stop character, four are used for control characters, and the forty-three remaining data characters are identical to those in CODE 39. CODE 93 uses two check characters. A termination bar is added after the stop character to close off the final space.

CODE 93 is continuous and non-self-checking. Bar and space width may be 1, 2, 3, or 4 units wide. Its structure facilitates using the edge-to-edge decoding of the UPC described by Savir and Laurer. The resulting symbol is inherently immune to uniform ink spread, which allows liberal bar width tolerances.

Today's open standards for bar code specify a minimum nominal unit of 0.0075 inch. The bar height is typically recommended to be 15 percent or more of the overall symbol length, excluding quiet zones which do not contain coded information.

To measure how efficiently codes represent data, it is necessary to develop a simple measure of efficiency. Whereas in one-dimensional structures, such as bar codes, the accepted measure of space consumption is the unit, for two dimensions, an appropriate measure is the square unit.

Information content is measured in bits. For a character-based system, it is assumed that all characters in the set are equally probable, so that if C is the size of the character set, then the information content, I, in bits per character, is $I = \log_2 C$. For example, if only the ten digits are represented, then C equals 10, and I equals 3.322 bits per character. If, instead, the full ASCII set of 128 characters is to be represented, then C equals 128, and I equals 7. CODE 39, having 43 data characters, contains 5.426 bits per character, excluding the overhead of the code's start and stop characters and any check or flag characters in the application data stream.

For bar code, efficiency is measured in bits per unit, while for two-dimensional systems, efficiency is measured in bits per square unit. Gross efficiency excludes all of the overhead characters, while net efficiency considers a whole symbol, including start, stop, and check characters. A 100 percent efficient system would provide one bit of information per unit if it were one-dimensional, or one bit per square unit if it were two-dimensional. Since all practical systems must provide for orientation, clocking, and checking, their net efficiencies will always be less than 100 percent. In the case of a synchronous ASCII data transmission (where unit time intervals are equivalent to the unit dimension of a bar code), overhead typically includes a start bit, a stop bit, and a parity bit, so that ten units are required to convey seven information bits. A synchronous ASCII transmission therefore has a gross efficiency of 70 percent.

The following table indicates the gross and net efficiencies of CODE 39 and CODE 93:

TABLE 1

|  | Gross efficiency (bits per unit) | Net efficiency (bits per unit) |
| --- | --- | --- |
| CODE 39 (19 characters) | 37.4% | 34.0% |
| CODE 93 (18 characters) | 61.7% | 50.2% |

Considering an 18 character string of CODE 93 characters (containing $18 \times \log_2 47 = 99.983$ bits), its two-dimensional efficiency as a function of varying symbol height is shown in the following table:

TABLE 2

| Symbol Height, Units | Efficiency, Bits per Square Unit |
| --- | --- |
| 30 | 0.017 |
| 20 | 0.025 |
| 4 | 0.126 |
| 2 | 0.251 |
| 1 | 0.502 |

The efficiency of a $5 \times 7$ dot matrix array displaying the 128 ASCII characters is $7/48 = 0.146$ bits per square unit, assuming that each character is bordered by a unit, assuming that each character is bordered by a unit of space to its right and another unit of space below. Therefore, a four unit high string of eighteen CODE 93 characters has essentially the same area efficiency as a string of $5 \times 7$ dot matrix characters. However, with a unit size of 0.0075 inch, the string of eighteen CODE 93 characters is about one and one-half inches long. Even if the unit size is reduced to 0.003 inch, the symbol length is still 0.6 inch, which is too long for labeling very small objects. Thus, the problem with bar code is not so much one of area efficiency as one of excessive symbol length.

It can be desirable to attach bar code symbols to very small objects, such as surface mount electronic devices. Such small components, having areas on the order of one-quarter inch on a side cannot be labeled with currently available linear arrays of bar code symbols.

Potential solutions to the problem of the need for a miniature printed code include (1) an optical character recognition (OCR) system, (2) a unique, two-dimensional optical marking system, (3) a tiered bar code, and (4) a new symbology structure compatible with prevailing standard bar codes. OCR presents problems of reading complexity and only moderate spatial efficiency. Data accuracy is achievable by adding a sufficient number of redundant check characters, but this exacerbates the space efficiency problem.

Unique, two-dimensional optical marking systems most space-efficient alternative. Two-dimensional structures are analyzed as a whole, i.e., they are not analyzed as a series of one-dimensional structures. Accordingly, their analysis is more complex and the equipment to perform the analysis is more expensive. Various two-dimensional structures have been proposed, and some have been implemented. TEMA Code, devised by Ray Stevens in the late 1970s, is a two-dimensional extrapolation of CODE 39. It was originally intended to be read by a hand-held device similar to the charge-coupled device (CCD) readers used to scan OCR characters. More recently, VERICODE (a trademark of VERITEC Corporation) has been promoted for labeling of small objects. Essentially, VERICODE (tm) is a checkerboard-like pattern of black or white square units. Published literature from VERITEC suggests two-dimensional space efficiencies in the range of 65 percent and better. VERICODE (tm) is not presently an open system. It appears to require vision system techniques for scanning.

The problem of restricted length on miniature objects might be solved by using a tiered bar code. For example, the AIAG shipping label consists of four or more bar code symbols arranged in four rows. By using multiple symbols in rows, the overall length can be significantly reduced. For example, eight tiers of CODE 93, each row containing four data digits, has a total capacity of thirty-two alphanumeric characters.

It is quite easy to scan such a symbol with a hand-held moving beam laser scanner or with a rastering-type scanner. However, it is not particularly easy to select the individual rows in precise sequence. If the reading order of the rows doesn't matter, this difficulty is unimportant. However, if the reading order is important, some means for making the rows self-identifying must be established. This could be accomplished by making the first character of each row a row identifier. This, however, would reduce the data capacity of the CODE 93 example to three characters per row (twenty-four characters in eight rows), significantly reducing the efficiency of such a code.

If a scanner were specially programmed to read multiple rows of CODE 93, sort them into row sequence, and strip out the row identifiers before transmitting the message, then the structure would become practical. However, the high overhead in CODE 93 and the lack of a natural means of identifying rows makes this proposal less than optimum. Any of the standard bar codes could be thus arranged in a tiered structure, but the built-in overhead makes these structures space inefficient.

In accordance with the foregoing analysis, it is known that a predetermined length of bar code symbols can represent a larger number of purely numerical data characters than alphanumeric characters (even if they are all numbers). This is so because each character taken from a purely numeric collection of characters contains less information than does each numeric character taken from an alphanumeric collection of characters.

It is therefore desirable to have a new symbology specifically designed for miniature object identification and tracking. It is also desirable to be able to have such a new symbology that can more efficiently represent strings of purely numeric data than is possible with alphanumeric representations.

DISCLOSURE OF THE INVENTION

It is an object of the present invention to provide an area-efficient symbology for labeling miniature objects.

It is another object of the present invention to provide an area-efficient symbology that is resistant to dust, dirt, and incidental damage.

It is still another object of the present invention to provide a symbology that has a small maximum dimension.

It is yet another object of the present invention to provide an area-efficient symbology that is capable of autodiscrimination with existing popular bar codes.

It is a still further object of the present invention to provide an area-efficient symbology that is easily read by low-cost equipment.

An additional object of the present invention is to provide a symbology that can compactly represent long strings of purely numeric data.

Yet another object of the present invention is to provide a method for decoding an area-efficient symbology having one or more of the objects given above.

According to one aspect, the invention provides a bar code symbology comprising a plurality of ordered rows of bar coded information. The bar coded information in each of the plurality of rows consists of an array of code words, each code word representing at least one information-bearing character and being selectable in even or odd parity form. Each of the characters has a distinct attributable numerical value, at least one of the plurality of characters in each row bearing information regarding the remainder of the characters in that row. The array of code words in each row has a word parity pattern indicative of the order of that row, a predetermined one of the ordered rows comprising at least one character containing information regarding the number of ordered rows and regarding the information-bearing characters in the ordered rows.

In another aspect, the present invention provides a method of decoding bar code symbology comprising a plurality of ordered rows of bar code characters. Each row contains a row check character and a plurality of encoded characters grouped into words and each word has one of two possible parities according to the order of its row and its position within its row. Each character has a corresponding numerical value and a predetermined character in a predetermined row specifies both the number of rows and a check sum on the character numerical values. The method comprises the steps of (a) receiving the characters contained in a first row of bar code characters, (b) performing a first parity check on the parity of each of the words made from the characters contained in the first received row of bar code characters, and returning to step (a) unless the first parity check is passed by each word in the received row. The method further comprises the steps of (c) decoding the bar code characters comprising the first received row into their corresponding numerical values, (d) computing a check sum on the corresponding numerical values of the bar code characters, and (e) comparing the computed check sum with the numerical value of the check sum character read from the first received row of bar code characters, and returning to step (a) if the computed check sum and the received check sum are not equal. Further, the method comprises the steps of (f) performing a second parity check on the parities of the words in the first received row of bar code characters, (g) establishing the order of the first received row of bar code characters based on the result of step (f), (h) determining, from the predetermined character, the number of rows and the data check sum if the first received row of bar code characters is the predetermined ordered row, (i) receiving the remainder of the rows of bar code characters according to steps (a)-(g) and according to the results of the number of rows determined in step (h) until all of the rows of bar code characters have been received, and (j) computing the check sum of the data contained in the rows received according to steps (a)-(i) and comparing the computed data check sum with the received data check sum. Finally, the method comprises the steps of (k) returning to step (a) if the computed data check sum is not equal to the received data check sum and (l) producing a signal signifying a correct decoding of the information contained in the bar code if the computed data check sum is equal to the received data check sum.

BEST MODES FOR CARRYING OUT THE INVENTION

Figure 1:
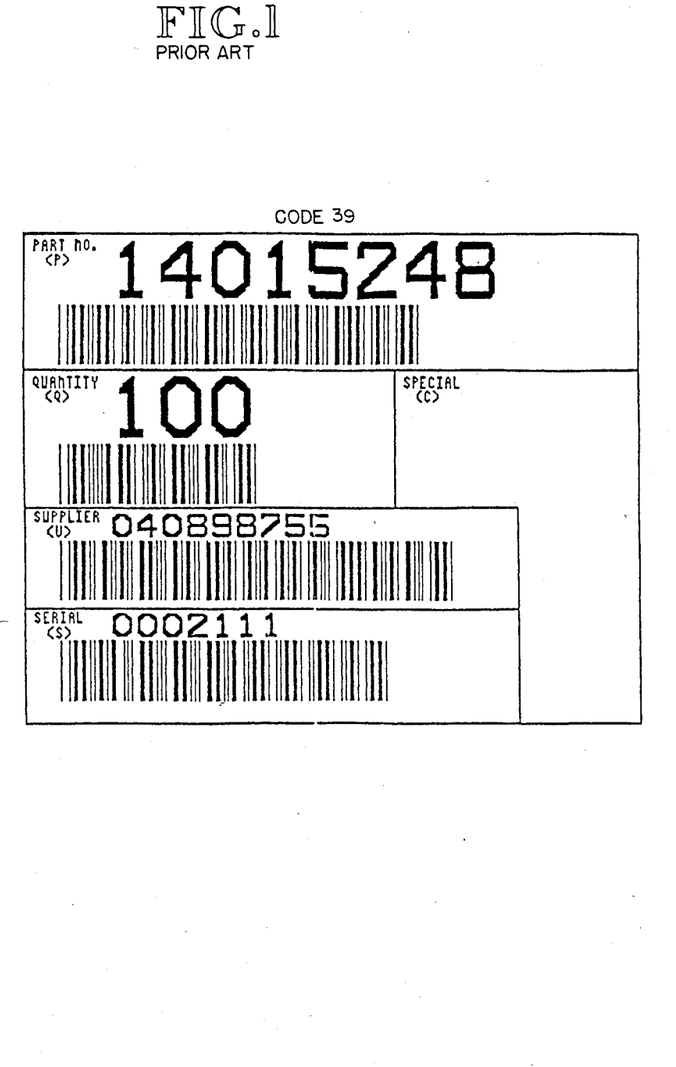
FIG. 1 is an example of an AIAG label known in the prior art.

Referring to FIG. 1, an example of an AIAG label known in the prior art consists of four or more separate bar code sections on a single label. As discussed above, it is an object of the present invention to provide a multitrack bar code capable of storing the information shown in the label of FIG. 1 in a much more area efficient form that does not have a significant linear extent.

Figure 2A:
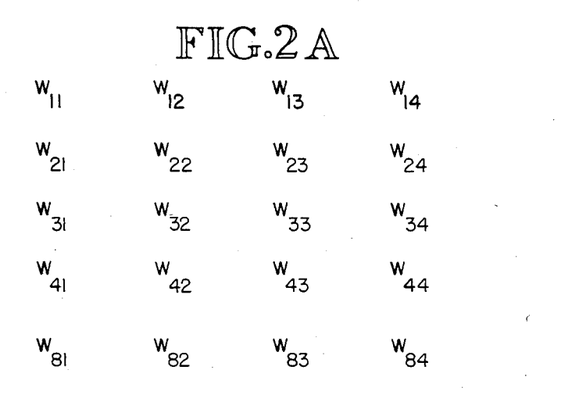
FIG. 2A is a schematic diagram of the word structure of the multitrack bar code of the present invention.
Figure 2B:
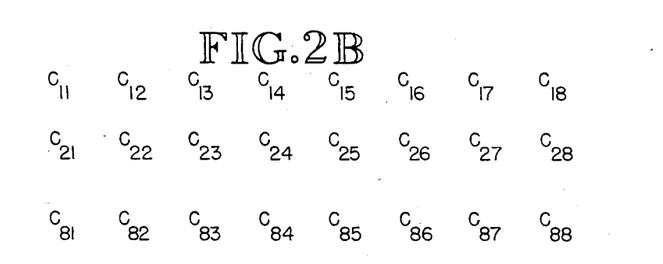
FIG. 2B is a schematic diagram of the character structure of the multitrack bar code of the present invention.

The structure of the multitrack (or multirow) bar code of the present invention is shown in FIGS. 2A and 2B. FIG. 2A shows that the word structure of the multitrack bar code of the present invention consists of a plurality of rows (up to eight), each containing four words, $W_{i1}$, $W_{i2}$, $W_{i3}$, $W_{i4}$. Each word, $W_{ij}$, consists of the concatenation of two characters whose corresponding numerical values are used to calculate a numerical value which is coded into binary strings in the multitrack bar code. FIG. 2B shows the correspondence between the characters making up the words in the multitrack bar code and the words themselves.

The code can represent either alphanumeric or numeric data, with maximum character capacity shown in the table below:

TABLE 3

| Number of tracks | Maximum number of data characters | |
|---|---|---|
| | Alphanumeric | Numeric |
| 2 | 13 | 20 |
| 3 | 20 | 31 |
| 4 | 27 | 43 |
| 5 | 34 | 55 |
| 6 | 41 | 66 |
| 7 | 48 | 78 |
| 8 | 55 | 90 |

In some situations to be described subsequently, the maximum number of data characters that can be represented may be reduced in order to use one of the rows as a column check row.

Figure 3:
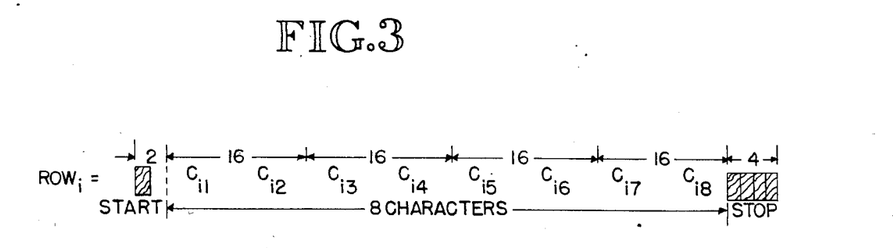
FIG. 3 is a schematic diagram showing the dimensions of the character structure of a row of the multitrack bar code of the present invention.

Each row (track) consists of four words, a start code, and a stop code. This structure is shown in FIG. 3. The start code is two units long, and consists of a single unit bar followed by assingle unit space. The stop code is one bar four units wide. Therefore, even though a row may be scanned in either left-to-right or right-to-left directions, the asymmetries of the start and stop codes allow the row to be decoded without directional ambiguity.

The words are each sixteen units wide and consist of four bars and four spaces. Therefore, each row is $2+(4\times16)+4=70$ units wide.

The bar code structure is that of a (16,4) code in the (n,k) family discussed by Savir and Laurer. The (16,4) structure provides for $15!/7!8!=6435$ different patterns. Of these, the present multitrack bar code uses only 4802 different words.

The words have either even parity (having an even number of black units), or odd parity. There are 2401 words of each parity in the code, and each unique word is assigned a value ranging from 0 to 2400. The value of a word is determined by the numerical values of the two corresponding characters.

Figure 4:
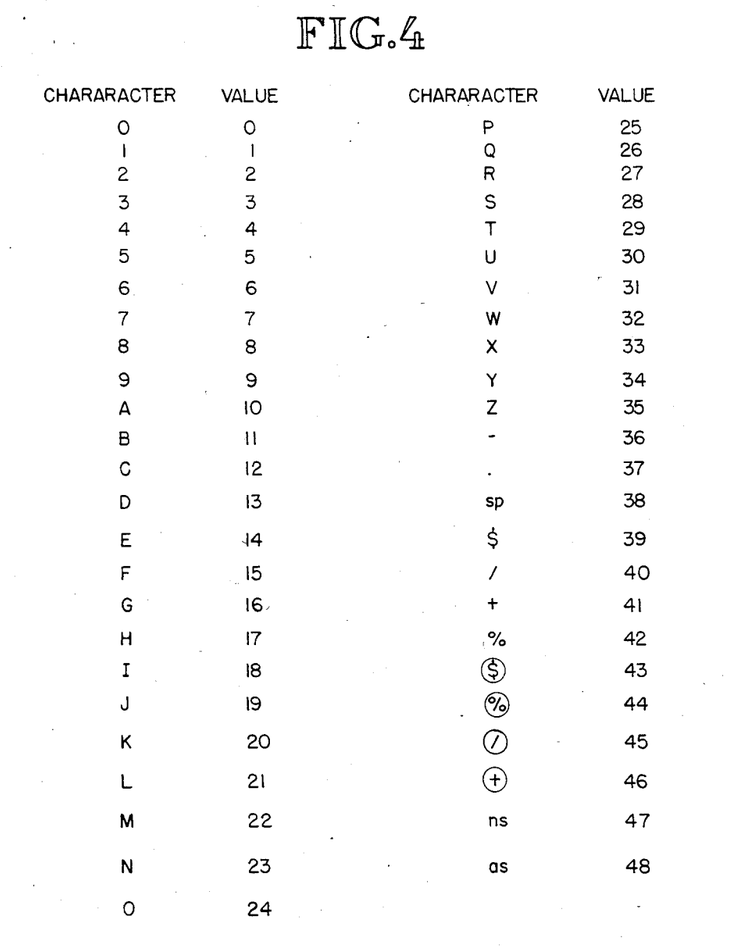
FIG. 4 is a table showing the numerical values of the characters of the code of the multitrack bar code of the present invention.

The numerical values of the characters of the code are shown in the table of FIG. 4. The characters of the code are the same as those found in CODE 93, with the addition of the "ns" (numeric shift) code whose use will be explained subsequently. Tee numerical value of a word $W_{ij}$ is computed according to $W_{ij}=49\ C_{i(2j-1)}+C_{i\ 2j}$.

Figure 5:
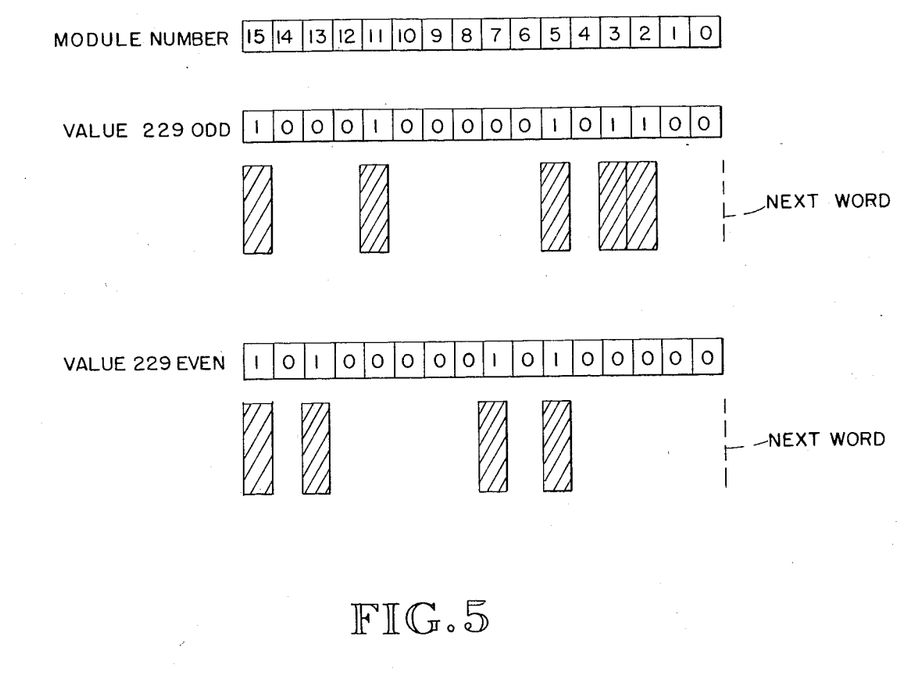
FIG. 5 is a schematic diagram showing the two parity forms of the numerical values corresponding to a word according to the code of the multitrack bar code of the present invention.

As an example, the character pair 4X corresponds to the character values 4 and 33. The word value is $49\times4+33=229$. FIG. 5 shows the odd and even forms corresponding to this word. The most significant bit in each word is a binary one and the least significant bit in each word is a binary zero. The odd parity word has an odd number (5, 7, 9, or 11) of units filled with binary ones, while the even parity word has an even number (4, 6, 8, 10, or 12) of binary ones. According to the structure of the (n,k) code, all of the information is contained in the module positions 1 through 14.

The values of the characters that make up a word can be computed from the word value by modulo 49 arithmetic. That is, 229 divided by 49 is 4 with a remainder of 33. A complete code chart (containing both even and odd forms of a particular word) has a total of 4802 entries. The bit pattern corresponding to a given word value can be determined by a table lookup.

Figure 6A:
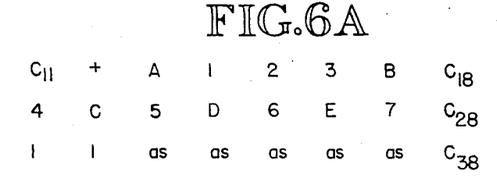
FIG. 6A is a schematic diagram of the character structure of an example of a first embodiment of the multitrack bar code of the present invention.
Figure 6B:
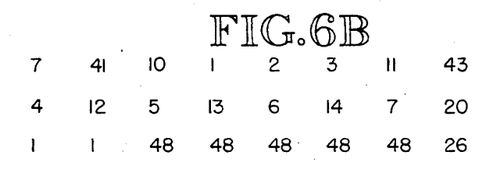
FIG. 6B is a schematic diagram of the numerical values of the example of the first embodiment of the multitrack bar code of the present invention given in FIG. 6A.

As shown in FIG. 6A, the message "+A123B4C5-D6E711" is encoded into a first embodiment of the multitrack bar code having three rows. The last (eighth) character in each of the rows is a row check sum, and the first character in the first row is a combined row count check and a message check. The message portion of the third row is completed by a string of "as" (alphanumeric shift) characters. The row check value of each row is determined by calculating a weighted modulo sum of the numeric values corresponding to the first seven characters in the row. The first through the sixth characters in the row are weighted by corresponding factors of one through six. The seventh character in the row is weighted by a factor of eight. As an example, the first seven characters in the second row are "4C5D6E7". As shown in FIG. 6B, the corresponding numerical values are 4, 12, 5, 13, 6, 14, and 7. Thus, the weighted sum of these values is $(1\times4)+(2\times12)+(3\times5)+(4\times13)+(5\times6)+(6\times14)+(8\times7)=4+24+15+52+30+84+56=265$. When reduced modulo 49, the value of 265 is 20, as shown in the last column of the second row.

The value for $C_{11}$, the first character in the first row, is determined by the formula $C_{11}=7\times(R\text{-}2)+M$, where R is the number of rows and M is the modulo 7 sum of the values of the message characters. In the example shown in FIGS. 6A and 6B, R is three and M is $41+10+1+2+3+11+4+12+5+13+6+14+7+1+1+48+48+48+48+48=371$, reduced modulo 7, or 0. Thus, the value of $C_{11}$ is 7. The multitrack bar code for the values shown in FIG. 6B is established by computing the corresponding word values for the character pair values, and looking up the corresponding binary strings in the tables described above.

The freedom to choose either an odd parity or an even parity binary string for each word allows each of the eight rows to be uniquely encoded by the even/odd parity of its constituent words. The pattern used in this multitrack bar code is shown in the following table.

TABLE 4

| Row | Parity of Words |
|-----|-----------------|
| 1 | O O O O |
| 2 | E O O E |
| 3 | E O E O |
| 4 | O O E E |
| 5 | E E O O |
| 6 | O E O E |
| 7 | O E E O |
| 8 | E E E E |

As can be seen, each row has an even number of even parity words (defining zero to be an even number). In addition, the order of each row can be determined from the word parity pattern without reference to the order in which the rows are actually read. The total number of rows cannot be determined (from the value of $C_{11}$) until the first row is read, but each row can be retained in a memory until they are.

Figure 7A:
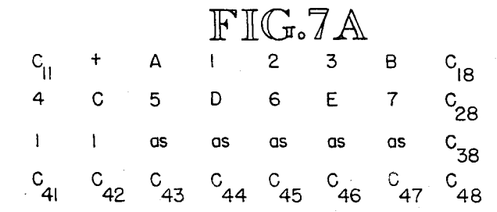
FIG. 7A is a schematic diagram of the character structure of an example of a second embodiment of the multitrack bar code of the present invention.
Figure 7B:
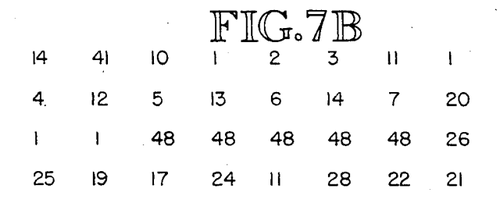
FIG. 7B is a schematic diagram of the numerical values of the example of the second embodiment of the multitrack bar code of the present invention given in FIG. 7A.
Figure 7C:
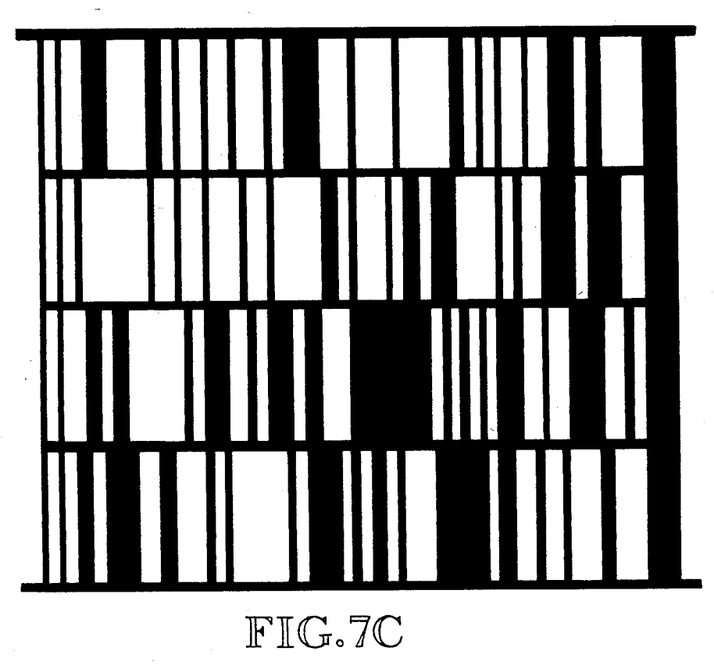
FIG. 7C is the multitrack bar code corresponding to the example of the second embodiment of the multitrack bar code of the present invention, as shown in FIGS. 7A and 7B.

In some situations, it may be desirable to have a stronger check on the encoded values. An example of this second embodiment of the multitrack bar code of the present invention is shown in FIGS. 7A–7C. In this example, the columns are also checked according to a modulo 49 summation. Each value is weighted with a weight of one. As a result, the code shown in FIGS. 7A–7C has one more row than that shown in FIGS. 6A–6B, even though they are encodings of the same message. This reduces the maximum number of data characters that can be represented by the given number of tracks, since the additional row is incapable of encoding any data characters. However, the row check character in the last row also serves as a check on the row check characters in the other rows according to a modulo 49 summation.

FIG. 7C shows the corresponding multitrack bar code. As shown in FIG. 7C, the bar heights are 7 units, with a 2 unit module bearer line between rows. This provides for an 8 row multitrack bar code symbol that is 70 units wide and 70 units high. If a unit is 0.005 inch, an 8 row symbol will occupy a 0.35 inch square. A 4 row symbol will measure 0.35 by 0.175 inch.

Figure 8A:
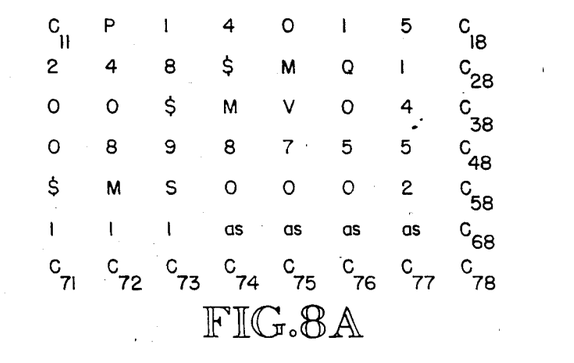
FIG. 8A is a schematic diagram of the character structure of an example of a third embodiment of the multitrack bar code of the present invention.
Figure 8B:
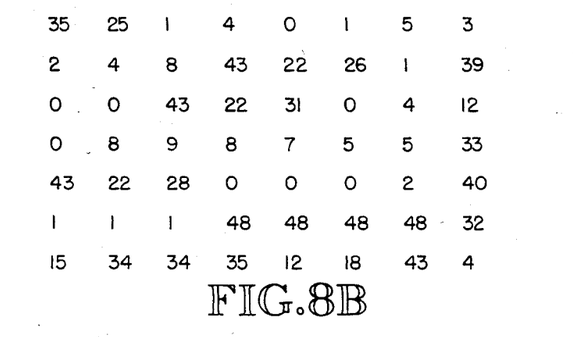
FIG. 8B is a schematic diagram of the numerical values of the example of the third embodiment of the multitrack bar code of the present invention given in FIG. 8A.
Figure 8C:
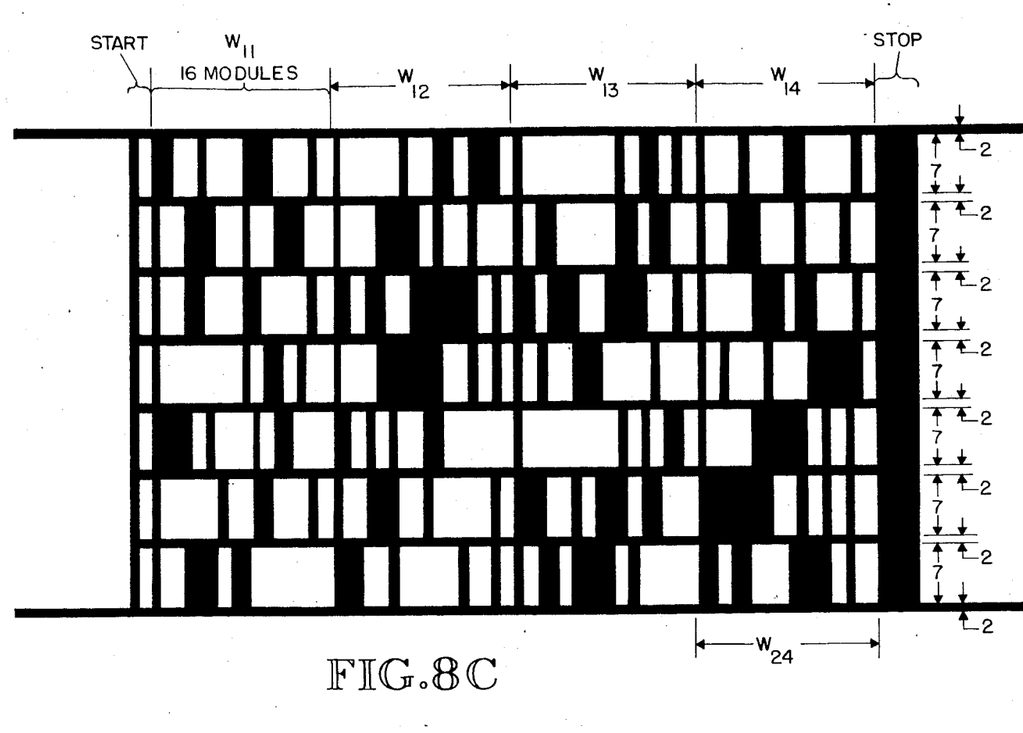
FIG. 8C is the multitrack bar code corresponding to the example of the third embodiment of the multitrack bar code of the present invention, as shown in FIGS. 8A and 8B.

FIGS. 8A–8C show the multitrack bar code corresponding to the AIAG label of FIG. 1. In this case, each of the fields (part number, quantity, supplier, and serial) is encoded as a number preceded by a letter (P, Q, U, and S, respectively). The $ M sequence that appears three times in the character shown in FIG. 8A is a carriage return sequence according to the ASCII character set. The code of the present multitrack bar code is the same as that of CODE 93 in that it makes use of control characters to greatly expand the number of characters that can be represented. FIG. 8B shows the numerical values corresponding to the characters shown in FIG. 8A (including column checks), and FIG. 8C shows the seven track multitrack bar code corresponding to the message on the AIAG label of FIG. 1. This multitrack bar code can be placed in an area less than 0.35 inch on a side —substantially smaller than the area required by the AIAG label.

Figure 9A:
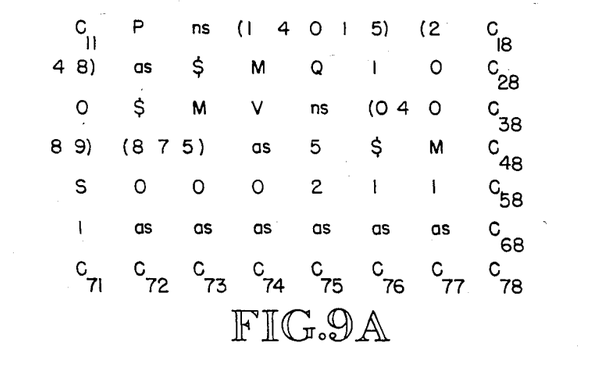
FIG. 9A is a schematic diagram of the character structure of an example of a fourth embodiment of the multitrack bar code of the present invention.
Figure 9B:
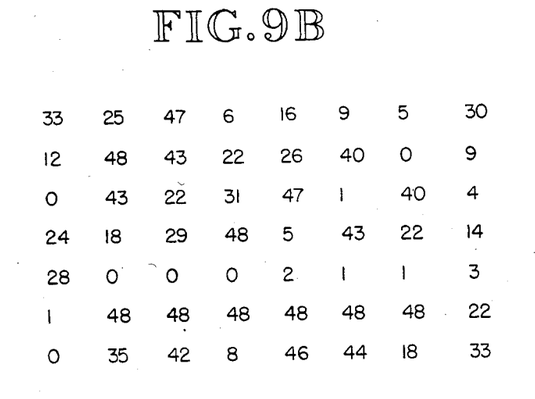
FIG. 9B is a schematic diagram of the numerical values of the example of the fourth embodiment of the multitrack bar code of the present invention given in FIG. 9A.

FIGS. 9A and 9B show a further advantage of the multitrack bar code of the present invention, as a fourth embodiment. When representing strings of numeric data of at least eight decimal characters, the code can be put into a numeric mode by the "ns" (numeric shift) character. The "as" character returns the multitrack code to the alphanumeric mode. It can be seen that five decimal digits $C_1$ through $C_5$ can be coded into three characters modulo 47, since $47^3 = 103,823$, which is greater than $10^5$. This explains the approximate 3:5 ratio between the maximum number of alphanumeric and numeric data characters that can be represented by a given number of tracks, as shown in Table 3. When only 3 decimal digits remain after a numeric string is divided into groups of five decimal digits, the last 3 decimal digits are represented by 2 characters where the value of the three digits $= 47 C_1 + C_2$. For example, since $14015 = 6 \times (47)^2 + 16 \times 47 + 9$, the numeric string 14015 in the first row of the character structure shown in FIG. 9A encodes to the three characters 6, 16, 9, as shown in the first row of the numerical value representation shown in FIG. 9B.

In practice, it has been found that the same scanning equipment that reads CODE 39, CODE 93, and other major bar code formats can also be programmed to read the present multitrack bar code. The reflectance of the bar code elements in a given row can be sampled at a high rate (e.g., 3.6862 MHz), so that several samples will be taken from each element in the row. The resulting pattern of high and low reflectances can be recorded and subsequently analyzed.

The first test that can be performed is to count the number of bars in the row. As may be seen from FIGS. 3 and 5, there should be a total of eighteen bars in a single row. (The start and stop codes each have one bar and each of the four words has four bars.) Next, the distance between the start bar and the first adjacent character is measured. This distance should be approximately one-sixteenth of the length of the first adjacent character. The number of even parity words in the row is then checked to determine that it is even. The ordinal number of the row can also be determined at this point, in accordance with the word parity patterns shown in Table 4. If all of these checks are passed, the stored row check information is compaeed to a row check that is computed from the data in the received row. Assuming that the received row passes the row check test too, an audible signal (for example, a click) will be produced, the received row will be stored for later use, and the bar code will be scanned again.

If the received row is the first row, and has information regarding the total number of rows and the message check code, this information is also stored for later use.

If the next row that is received is the same as one which has already been stored, it will be ignored and the scanning device will continue to scan the multitrack bar code. The bar code will be scanned until all of the rows have been found and decoded. At this point, the message check code that was stored in the first character of the first row will be compared to a message check that is computed from the message data that have been received. If, in addition, there are column checks, these will also be performed after all of the rows have been successfully decoded. Following the successful completion of these checks, another audible signal can be produced (for example, a ringing sound), indicating that the code has been successfully decoded.

While the preferred embodiments of the present invention have been presented in the foregoing, those skilled in the art will recognize modifications that will not depart from the spirit and scope of the present invention. Accordingly, the spirit and scope of the present invention are to be measured only by the following claims.

I claim:

1. A bar code structure comprising a plurality of ordered rows of bar coded information, the bar coded information in each of the plurality of rows consisting of an array of code words, each code word representing at least one information-bearing character and being selectable in even or odd parity form, each of the characters having a distinct attributable numerical value, at least one of the plurality of characters in each row bearing information regarding the remainder of the characters in that row, the array of code words in each row having a parity pattern indicative of the order of that row, a predetermined one of the ordered rows comprising at least one character containing information regarding the number of ordered rows and regarding the information-bearing characters in the ordered rows.

2. The bar code structure of claim 1 wherein the characters in each code word are ordered.

3. The bar code structure of claim 2 wherein there are two characters in each code word.

4. The bar code structure of claim 1 wherein the at least one of the plurality of characters in each row bears information regarding the numerical values of the remainder of the characters in that row.

5. The bar code structure of claim 4 wherein the information that the at least one of the plurality of characters in each row bears is a weighted sum of the numerical values of the remainder of the characters in that row.

6. The bar code structure of claim 5 wherein the weighted sum is reduced modulo a predetermined integer.

7. The bar code structure of claim 2 wherein the information that the at least one of the plurality of characters in each row bears is a weighted sum of the numerical values of the remainder of the ordered characters in that row.

8. The bar code structure of claim 2 wherein the code words in each row are ordered and the information that the at least one of the plurality of characters in each row bears is a weighted sum of the numerical values of the remainder of the characters in that row, the weight being applied according to the order of the characters in the row.

9. The bar code structure of claim 8 wherein the number of code words in each row is fixed.

10. The bar code structure of claim 9 wherein each row is directionally unambiguous.

11. The bar code structure of claim 1 wherein the information regarding the information-bearing characters that is contained by the at least one character in the predetermined one of the ordered rows is a summation of the numerical values corresponding to the information-bearing characters.

12. The bar code structure of claim 11 wherein the summation is reduced modulo a predetermined integer.

13. The bar code structure of claim 1 wherein the bar coded information can be a combination of alphanumeric information and numeric information, the alphanumeric information-bearing characters being chosen from a first set of characters and the numeric information-bearing characters being chosen from a second set of characters.

14. The bar code structure of claim 13 wherein each character can bear alphanumeric information or numeric information, depending upon the presence of an alphanumeric shift character or a numeric shift character.

15. A bar code structure comprising a plurality of ordered rows of bar coded information, the bar coded information in each of the plurality of rows consisting of an ordered array of a fixed number of code words, each code word representing an ordered plurality of nnformation-bearing characters and being selectable in even or odd parity form, each of the characters having a distinct attributable numerical value, at least one of the plurality of characters in each row being a weighted summation of the numerical values corresponding to the remainder of the ordered characters in that row, the summation being taken modulo a predetermined integer and the weights being the order of each of the characters in the row, the array of code words in each row having a parity pattern indicative of the order of that row, a predetermined one of the ordered rows comprising at least one character containing information regarding the number of ordered rows and regarding the weighted summation of the numerical values corresponding to the information-bearing characters in the ordered rows.

16. The bar code structure of claim 15 wherein there are two characters in each code word.

17. The bar code structure of claim 15 wherein the weighted summation of the numerical values corresponding to the remainder of the ordered characters in each row is taken modulo a predetermined integer that is greater than any of the numerical values attributed to the characters.

18. The bar code structure of claim 17 wherein the predetermined row is the first row.

19. A bar code structure comprising a plurality of ordered rows of bar coded alphanumeric information, the bar coded alphanumeric information in each of the plurality of rows consisting of an ordered array of a fixed number of code words, each code word representing an ordered plurality of alphanumeric information-bearing characters and being selectable in even or odd parity form, each of the characters having a distinct attributable numerical value, at least one of the plurality of characters in each row being a weighted summation of the numerical values corresponding to the remainder of the ordered characters in that row, the summation being taken modulo a predetermined integer that is greater than any of the numerical values attributed to the characters, and the weights being the order of each of the characters in the row, the array of code words in each row having a parity pattern indicative of the order of that row, a predetermined one of the ordered rows comprising at least one character containing information regarding the number of ordered rows and regarding the weighted summation of the numerical values corresponding to the alphanumeric information-bearing characters in the ordered rows.

20. The bar code structure of claim 19 wherein the predetermined row is the first row.

21. A method of decoding bar code symbology comprising a plurality of ordered rows of bar code caaracters, each row containing a row check character and a plurality of encoded characters grouped into words, each word having one of two possible parities according to the order of its row and its position within its row, each character having a corresponding numerical value, a predetermined character in a predetermined row specifying both the number of rows and a check sum on the character numerical values, the method comprising the steps of:

(a) receiving the characters contained in a first row of bar code characters;

(b) performing a first parity check on the parity of each of the words made from the characters contained in the first received row of bar code characters and returning to step (a) unless the first parity check is passed by each word in the received row;

(c) decoding the bar code characters comprising the first received row into their corresponding numerical values;

(d) computing a check sum on the corresponding numerical values of the bar code characters;

(e) comparing the computed check sum with the numerical value of the check sum character read from the first received row of bar code characters and returning to step (a) if the computed check sum and the received check sum are not equal;

(f) performing a second parity check on the parities of the words in the first received row of bar code characters;

(g) establishing the order of the first received row of bar code characters based on the result of step (f);

(h) determining, from the predetermined character, the number of rows and the data check sum, if the first received row of bar code characters is the predetermined ordered row;

(i) receiving the remainder of the rows of bar code characters according to steps (a)-(g) and according to the results of the number of rows determined in step (h) until all of the rows of bar code characters have been received;

(j) computing the check sum of the data contained in the rows read according to steps (a)-(i) and comparing the computed data check sum with the received data check sum;

(k) returning to step (a) if the computed data check sum is not equal to the received data check sum; and (l) producing a signal signifying a correct decoding of the information contained in the bar code if the computed data check sum is equal to the received data check sum.

22. The method of claim 21, further comprising the step of determining whether the number of bars represented by the bar code characters in each row is equal to a predetermined number.

23. The method of claim 22, further comprising the step of calculating column check sums on the columns of the received rows that contain information-bearing characters and comparing the calculated column check sums with the numerical values of the corresponding characters in an additional received row.

* * * * *